United States Patent [19]
Lisle

[11] Patent Number: 5,539,896
[45] Date of Patent: Jul. 23, 1996

[54] METHOD AND APPARATUS FOR DYNAMICALLY LINKING CODE SEGMENTS IN REAL TIME IN A MULTIPROCESSOR COMPUTING SYSTEM EMPLOYING DUAL BUFFERED SHARED MEMORY

[75] Inventor: Ronald J. Lisle, Cedar Park, Tex.

[73] Assignee: International Business Machines Corporation, Armonk, N.Y.

[21] Appl. No.: 176,337

[22] Filed: Jan. 3, 1994

Related U.S. Application Data

[63] Continuation of Ser. No. 608,126, Nov. 1, 1990, abandoned.

[51] Int. Cl.⁶ .................................................. G06F 13/00
[52] U.S. Cl. ................. 395/477; 364/221.4; 364/221.8; 364/228; 364/228.1; 364/228.6; 364/239.4; 364/246.3; 364/262.4; 364/262.5; 364/270; 364/DIG. 1; 395/480; 395/873; 395/375
[58] Field of Search ................................ 395/600, 425, 395/250, 375, 650, 800, 873, 474, 475, 477, 480; 364/132, 221.4, 221.8, 228, 228.1, 228.6, 239.4, 246.3, 262.4, 262.5, 270

[56] References Cited

U.S. PATENT DOCUMENTS

| | | | |
|---|---|---|---|
| 4,298,954 | 11/1981 | Bigelow et al. | 395/250 |
| 4,333,143 | 6/1982 | Calder | 395/873 |
| 4,562,436 | 12/1985 | Coleman et al. | 340/825 |
| 4,658,351 | 4/1987 | Teng | 395/650 |
| 4,667,286 | 5/1987 | Young et al. | 395/250 |
| 4,694,426 | 9/1987 | Mason | 365/78 |
| 4,791,489 | 12/1988 | Polatnick | 348/578 |
| 4,791,629 | 12/1988 | Burns et al. | 370/58.2 |
| 4,841,437 | 6/1989 | Lubarsky et al. | 371/20.1 |
| 4,897,780 | 1/1990 | Lakness | 395/600 |
| 4,991,169 | 2/1991 | Davis et al. | 370/77 |
| 5,133,062 | 7/1992 | Joshi et al. | 395/500 |
| 5,150,456 | 9/1992 | Wu et al. | 395/114 |
| 5,163,132 | 11/1992 | DuLac et al. | 395/873 |
| 5,167,028 | 11/1992 | Shires | 395/474 |
| 5,247,678 | 9/1993 | Littleton | 395/700 |
| 5,269,012 | 12/1993 | Denio et al. | 395/700 |

OTHER PUBLICATIONS

Decaluwe et al, "Interprocessor Communication in Synchronous Multiprocessor Digital Signal Processing Chips", IEEE Transactions on Acoustics, Speech, and Signal Processing, vol. 37, No. 12, Dec./1989, pp. 1816–1828.

*Primary Examiner*—Thomas G. Black
*Assistant Examiner*—Jack M. Choules
*Attorney, Agent, or Firm*—Robert M. Carwell

[57] ABSTRACT

A system is provided including a host processor and an audio capture and playback adapter having a DSP co-processor. The adapter includes shared memory accessible from both the DSP and the host. A DSP program is periodically written to the shared memory by the host and executed by the DSP. A non ping-pong dual buffer technique is disclosed wherein alternately one buffer is executed by the DSP while the remaining buffer is updated or linked by the host. In one embodiment, two pointer variables are used, each indicating respectively which buffer is currently being executed by the DSP and which has been updated by the host. Initially both pointer A and pointer B point to buffer A containing the initial DSP code. Each time the DSP requires execution of the configurable program, it reads pointer B, copies it to pointer A, and then branches to the buffer pointer A points to. When the host begins to relink to a buffer, it first sets pointer B equal to pointer A, relinks into the opposite buffer as pointer A, and then sets pointer B to this opposite buffer. The host is thereby prevented from updating a buffer currently being executed by the DSP. Real time dynamic linking of code segments in a tightly coupled co-processing system is thereby provided.

10 Claims, 5 Drawing Sheets ial apparent
METHOD AND APPARATUS FOR DYNAMICALLY LINKING CODE SEGMENTS IN REAL TIME IN A MULTIPROCESSOR COMPUTING SYSTEM EMPLOYING DUAL BUFFERED SHARED MEMORY This is a continuation of application Ser. No. 07/608,126 filed Nov. 1, 1990 which was abandoned.

TECHNICAL FIELD

This invention relates to optimizing techniques for use with executable computer code and more particularly, relates to computerized systems and methods for dynamically linking code segments.

BACKGROUND ART

In a digital signal processor implementation of some complex functions, it is common to utilize basic building blocks or code segments which may be interconnected in multiple ways. These code segments are analogous to separate hardware modules which might previously have been found in various systems employing patch chords or switchable hardwired interconnections to permit selection and configuration of the modules.

As but one example, although the invention is not intended to be so limited and admits to numerous embodiments and applications, in the implementation of a music synthesizer with a digital signal processor, such modules might include analogous software implementations of hardware modules such as oscillators, filters, or voltage controlled amplifiers. These modules were found in music synthesizers of the 1970s wherein they were interconnected as desired and as previously described with patch chords or other means.

In a DSP implementation of such complex functions, in many applications it may be desirable to reconfigure the system in real time. Again, using the musical application as but one example, it may be desirable to provide a DSP implementation of a music synthesizer wherein the synthesizer may be capable of being reconfigured in real time to permit generation of several different sounds at the same time. Such capability being referred to in the art as "polytimbral".

In such an implementation of function wherein real time reconfiguration is required (typically in DSP systems and code, although the invention is not so limited), one apparent solution to the problem of real time configuration is to group together all the possible code segments needed to implement a function such as the particular sound of one instrument, a filter, or the like. Each code sequence necessary to implement that function is made a "callable" routine. In this manner, a given configuration then need only be a list of such subroutines and the order in which they appear. It would appear by such an implementation, that this approach would allow for great flexibility in the configuration of the modules. However, it was found in the art that in fact such implementations suffered significant performance penalties resulting from the time involved to effect the necessary calls and returns made to each such code segment.

In the development of the art, a solution eventually appeared wherein the required code modules could be linked together as needed. This linking was a common programming procedure employed by program compilers, for example, which typically would collect multiple code segments together into a single code sequence.

One problem with this approach, however, relates to the particular application being discussed wherein various code modules in need of execution are changing over time, as is the case, for example, when a DSP, in order to implement a polytimbral combination of brass and woodwind sounds, for example, would be required to first implement the brass code module followed very quickly by that of the woodwind in order for the sound to be perceived as a simultaneous voicing of both instrument types. Moreover, the problem is compounded in certain applications due to the nature of shared memory DSP co-processor systems which may have a relatively small amount of shared memory on the order of 8K, for example, which must execute code resident therein at a very rapid rate. Due to the small memory size, in order to achieve the desired multi-timbral and other effects, it is necessary to periodically load other code from the host into this shared memory for execution by the DSP. However, due to the additional factor of this code having to execute very rapidly (for example to generate satisfying synthesized acoustic sound), the problem arose of how to interject such additional code modules into this limited memory in such a way so as to avoid the host attempting to update the buffer of such a shared memory while code in the buffer was being executed by the DSP.

Usually, the DSP is disabled during these periods when the host is writing additional DSP program modules to the shared memory so as to prevent the DSP from attempting to execute such instructions which have only partially been written out by the host processor to the shared memory. A "ping-pong" form of double buffering has long been known in the data processing arts wherein one buffer contains code being executed while a second buffer is being filled. The situation is then reversed wherein the code in the just-filled buffer executes while additional code is being loaded into the first buffer. However, this conventional practice, while useful in preventing the host from updating the buffer being executed by the DSP in some instances, is not entirely satisfactory. For example, if the host attempted to update buffers twice in rapid succession such a double buffering technique would not prevent the undesired updating by the host of the buffer being executed by the DSP.

Accordingly, for these and other reasons, a system and method were long desired for dynamically linking code segments wherein executable code is optimized by performing linking of code segments in real time.

SUMMARY OF THE INVENTION

A system is provided including a host processor and an audio capture and playback adapter having a DSP co-processor. The adapter includes shared memory accessible from both the DSP and the host. A DSP program is periodically written to the shared memory by the host and executed by the DSP. A non ping-pong dual buffer technique is disclosed wherein alternately one buffer is executed by the DSP while the remaining buffer is updated or linked by the host. In one embodiment two pointer variables are used, each indicating respectively which buffer is currently being executed by the DSP and which has been updated by the host. Initially, both pointer A and pointer B point to buffer A containing the initial DSP code. Each time the DSP requires execution of the configurable program, it reads pointer B, copies it to pointer A, and then branches to the buffer pointer A points to. When the host begins to relink to a buffer, it first sets pointer B equal to pointer A, relinks into the opposite buffer as pointer A, and then sets pointer B to this opposite buffer. The host is thereby prevented from updating a buffer currently being executed by the DSP.

BRIEF DESCRIPTION OF THE DRAWINGS

The novel features believed to be characteristic of the invention are set forth in the appended claims. The invention itself, however, as well as other features and advantages thereof, will be best understood by reference to the following description of the preferred embodiment when read in conjunction with the accompanying figures where:

FIG. 5 is an illustration of a double buffering technique known in the prior art for handling execution of code modules while simultaneously loading additional modules for execution.

DETAILED DESCRIPTION OF THE PREFERRED EMBODIMENT

Figure 2:
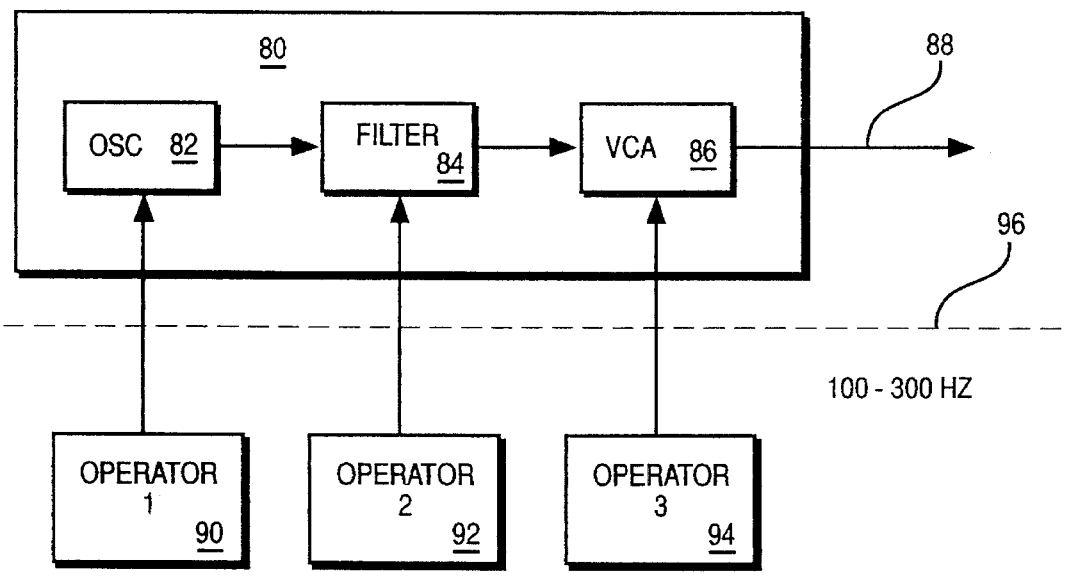
FIG. 2 is a block diagram of representative computer code for generating an acoustic sound by the system of FIG. 1 depicting a representative module and submodule building blocks.
Figure 3:
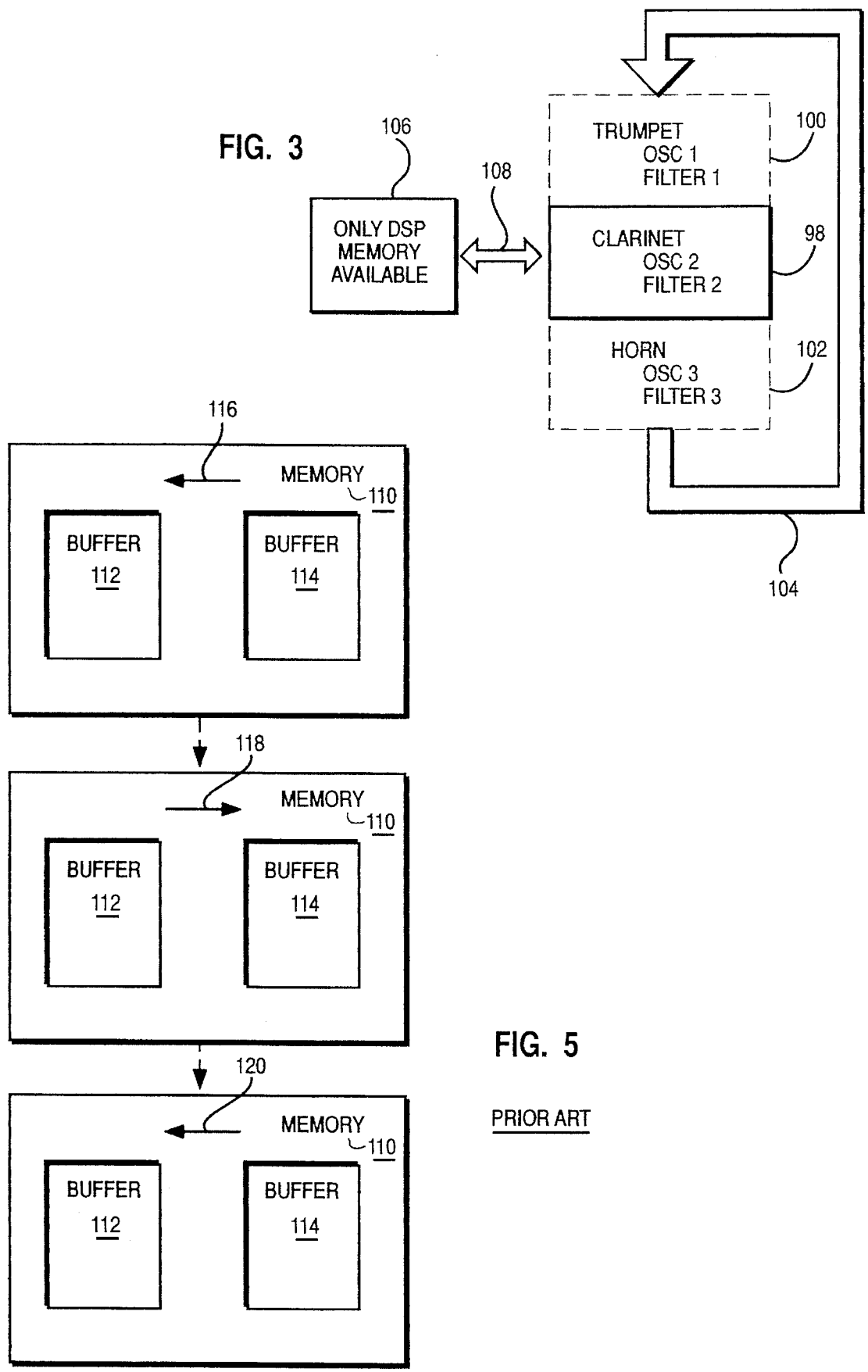
FIG. 3 is a schematic illustration of code segments comprising multiple modules such as that depicted in FIG. 2 intended to be executed by the digital signal processor system portion of the computerized audio system of FIG. 1.

First, a generalized description will be provided of an illustrative environment to which the invention may be adapted related to the generation of sound. In connection with this, the general functions provided by the digital signal processor or DSP component of the system of FIG. 1 will next be described with reference to FIGS. 2 and 3 and the code segments executed by this DSP to effect a musical sound generally (FIG. 2 showing typical illustrative code segments required for creation of sound generally and FIG. 3 showing the sequence of code segments to be executed for a user to perceive different multiple simultaneous sounds referred to as "multi-timbral" in the musical arts). Disclosure of a representative audio capture and playback adapter including such a DSP as a component of the system of FIG. 1 will then be provided with reference to FIG. 4. This will be followed by a discussion of the novel linking system of the invention employing a set of pointers to program addresses wherein various code segments of DSP code reside with reference to FIGS. 6A–6D.

Figure 1:
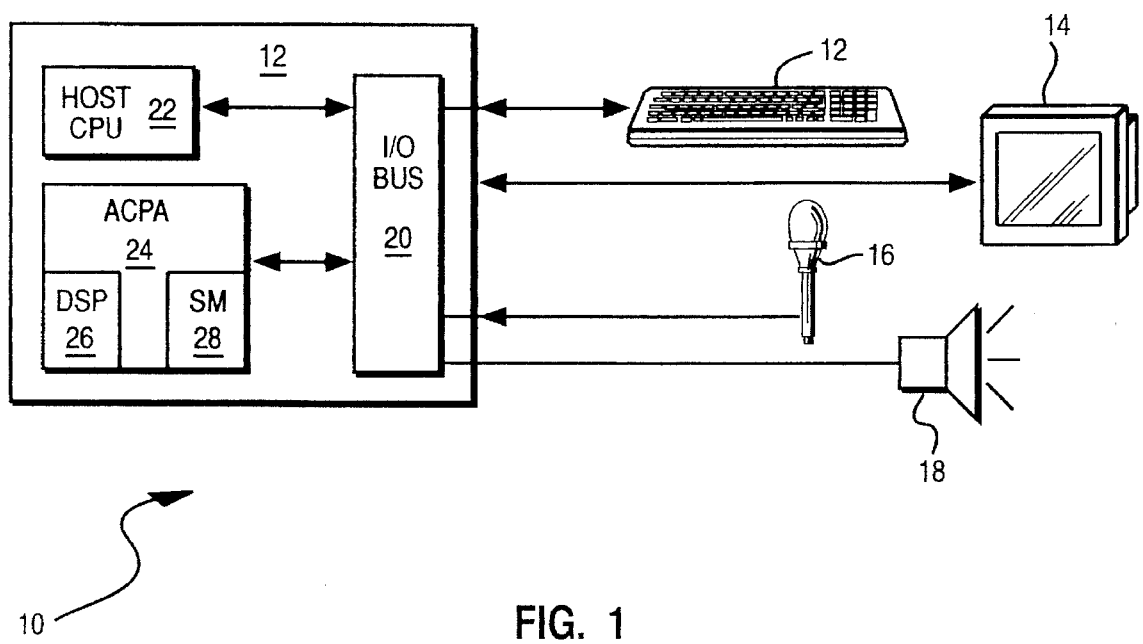
FIG. 1 is a high level schematic illustration of a computerized audio capture and playback adapter system employing the linking system of the invention.

Referring now to FIG. 1, a computerized audio capture and playback system 10 is depicted in simplified form. The system includes a computer 12 including a host CPU 22, and an I/O Bus 20. Interconnected to the Bus 20 are numerous peripheral devices well known in the art such as a keyboard 12, display 14, microphone 16, and speaker 18. The system 10 with the exception of an audio capture and playback adapter 24 to be hereinafter described may take the form of any conventional personal computer such as the PS/2 (PS/2 is a trademark of the IBM Corp.) computer marketed by the IBM Corporation. With respect to this audio capture and playback adapter (ACPA) 24, in a preferred embodiment it will take the form of an adapter card which may be plugged into an expansion slot which forms a portion of the computer 12. This ACPA card will preferably contain a digital signal processor 26 such as the TMS 320 C25 signal processor available from the Texas Instruments Corporation. Additionally the ACPA 24 will include shared memory 28 accessible both by the DSP 26 and the host CPU 22 through the I/O bus 20.

One purpose of the ACPA card 24 is to receive analog audio data from an audio source such as microphone 16 through the bus 20, and to "capture" or digitize this audio data, store it, and then later retrieve it whereupon it is converted back to analog form and sent out on the I/O bus 20 to an appropriate sound transducer such as a speaker 18. The keyboard 12 and 14 will serve conventional purposes well known in the art of facilitating human interface to the computer 12 and are thus not discussed herein. For purposes of simplicity, other necessary components of the computer 12 are omitted for clarity which are well known in the art, such as disk memory and the like.

Yet an additional important function of the adapter card 24 is to execute code which may generate synthesized sounds. In this form of operation, executable code is stored in the shared memory 28 which is accessed and executed by the DSP 26, the output of which is passed through the I/O bus 20 to the speaker 18 if desired, recorded, or the like. An important notion with respect to the system of FIG. 4 which will be hereinafter described in greater detail relates to the fact that the system 10 of FIG. 1 in which the invention is implemented is a tightly coupled co-processing system wherein shared memory is included accessed by multiple processors such as that of the host CPU 22 and the DSP 26. Although in the implementation shown in FIG. 10 one of the processors is a digital signal processor well known in the art, it will be readily appreciated that the invention is not intended to be so limited and admits to other implementations not involving DSPs but some other form of multiple processors accessing this shared memory 28 to form a tightly coupled co-processing system.

It will be noted that, as will become clearer in he disclosure to follow, this shared memory 28 will contain memory locations which may be read by the host CPU 22 as well as the DSP 26 and written into by the CPU 22. This shared memory 28 will include code segments or modules which will be executed by the DSP 26 to generate the desired sounds. However, due to the limitations on size of this shared memory 28 and the need for it to execute rapidly, it is necessary for the host CPU 22 to load in from time to time additional such code segments for sequential execution by the DSP. Inasmuch as both the DSP 26 and the CPU 22 have access to this common memory, this gives rise to a problem addressed by the subject invention wherein contention or conflicts may occur with respect to this shared memory 28. This relates to the fact that shared memory is accessed in a co-processing environment by multiple processors such as the DSP 26 and CPU 22.

Referring now to FIG. 2, a functional block diagram is shown of typical code segments which must be implemented and executed by the DSP 26 to generate audio sounds. It will be noted in passing that although an audio application is discussed, that the invention is not to be so limited but has application to a variety of code modules. It will further be appreciated that the particular function being performed by this code segment 80 of FIG. 2 executed by the DSP 26 could be essentially any function although in the particular embodiment being discussed these functions happen to relate to generation of audio sounds. In a digital signal processor implementation of sound, such as in the case of a DSP emulation of a music synthesizer, it is common to utilize basic building blocks or code segments such as code segment 80 which contains sub blocks such as oscillator 82, filter 84, voltage controlled amplifier (VCA) 86 and various operators 90–94 which may be interconnected in multiple ways to generate many different sounds as desired. Such code segments are analogous to the separate hardware modules found on larger music synthesizers of the 1970s. In the latter case, it was conventional either to use patch chords or a limited set of switchable hardwire interconnections to allow selection and configuration of the modules as desired. However, in the modern implementation of a music synthesizer under discussion, it is desirable to reconfigure in real time to allow the execution of several different sounds at the same time, such function being referred to as polytimbral. This such operation necessitates sequential execution of different versions of modules such as that shown in FIG. 2. It will be noted from the line 96 of FIG. 2 that some of the functions necessary to generate sound for a given module such as those above line 96 may be implemented by the DSP 26 executing code corresponding to these functions in the code segment 80 resident in the shared memory 28.

Additional functions below line 96 such as the operators 90—94 may be executed by the host CPU 22. The functions appearing above line 96 would be those requiring rapid sequential execution wherein the code segments of the submodules such as the oscillator 82, filter 84, and VCA 86 must execute rapidly in a looping successive fashion to generate the desired digital output 88 which may be converted to perceptible analog audio output. Such a loop through the entire collection of code segments shown in box 80 may typically occur at the audio digitizing or sample rate of, for example, 44 Kilohertz, e.g. the code segment 80 will be looped through and executed once for every sample generated for an audio signal from the audio source 16.

In contrast, additional code of FIG. 2 below the line 96 may execute at a much slower rate such as 100–300 hertz which may thus typically be executed by the CPU 22. Examples of such operators being implemented by the CPU 22 at the same time the code of segment 80 is being executed by the DSP 26 include amplitude envelopes for example. In addition to the rapid execution required of the code segment 80 yet an additional reason for limiting the amount of code executing by the DSP relates to the nature of the onboard shared memory 28 associated with the DSP 26, namely that such memory is quite limited in size relative to the conventional memory normally associated with a computer system 12. As an example, it may be common in such systems to have only 8K of shared memory. Due to the need to have different types of code modules such as that of FIG. 2 executing sequentially to achieve the desired multi-timbral effect and the constraint of a limited memory size, it will be readily apparent that it may be necessary for the host CPU 22 from time to time to load into the shared memory 28 additional such code segments such as that of FIG. 2. This may be seen illustrated with reference to FIG. 3.

Referring now to FIG. 3 in greater detail, a code segment 98 is shown which may correspond to the code segment 80 of FIG. 2 including the necessary DSP code such as oscillators, filters, and the like to generate a clarinet sound. Also shown in FIG. 3 are additional code segments 100 and 102 similar to that of code segment 98 and the generalized representation of code for generating an instrument such as the code segment 80 of FIG. 2. It will be noted from FIG. 3 that in order to generate a different instrument such as a trumpet or horn represented by code segments 100 or 102, a different form of oscillator 82, filter 84 or other submodules or combinations thereof are required. By the DSP 26 executing these various code segments 100, 98 and 102 sequentially as shown schematically by the arrow 104 and by doing so rapidly enough, the audio data thereby made available from the ACPA 24 as indicated by output 88 of FIG. 2 will achieve the desired polytimbral effect wherein a human may perceive the simultaneous sounding of the trumpet, clarinet, and horn corresponding to these code segments 100, 98, and 102.

It will be recalled that due to the limited size of the shared memory 28, it is sometimes not possible to include all of the code segments 100, 98 and 102 in the shared memory. This is illustrated by the box 106 and arrow 108 indicating that the shared memory 28 may perhaps be large enough only to contain the code segment associated with the clarinet 98. Accordingly, it will be readily perceived that a need exists at the appropriate time for the host CPU 22 to load these additional code segments such as that of the trumpet 100 or horn 102 into the shared memory 28. Yet an additional reason for providing the facility of being able to load additional code segments from the CPU 22 into the shared memory 28 for execution by the DSP 26 in real time is that the necessary or desired additional code segments might be determined on the fly in real time and thus change over time as a function of other parameters or considerations. One problem in providing the facility in a co-processing environment for permitting the CPU 22 to load these additional code segments into the shared memory 28 is that this shared memory is also being accessed simultaneously by the DSP 26.

Accordingly, a problem arises in being able to asynchronously permit the CPU 22 to download appropriate additional code segments as desired into this shared memory 28 without affecting the accessing of the shared memory 28 by the DSP 26 and thus without interfering with the sequential execution of code in the shared memory 28 by this DSP 26. As a simple illustrative example, the DSP 26 may be in the middle of executing code in the shared memory 28 associated with the oscillator function 82 of FIG. 2 when, due to the asynchronous operation of the CPU 22, the CPU 22 begins downloading another code segment into the shared memory 28 thereby overwriting code yet to be executed by the DSP 26 related to this oscillator 82 function.

Figure 6A:
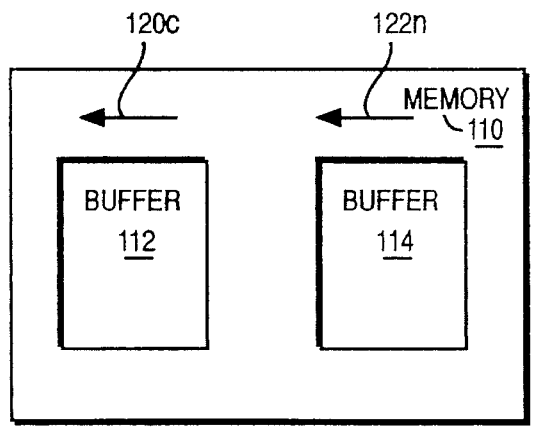
FIGS. 6A–6D are schematic illustrations of the sequential status of pointers employed in the linking system of the invention.
Figure 7:
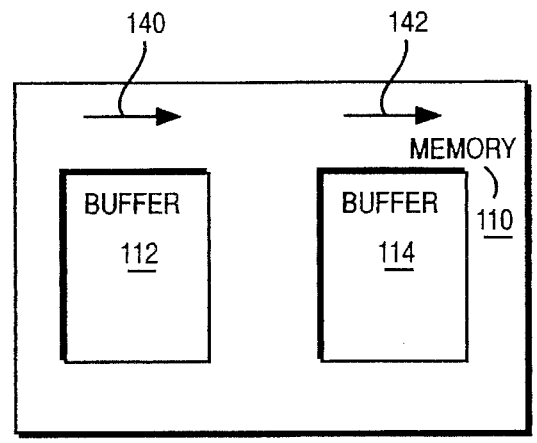
FIG. 7 is an illustration of a specific state of pointers in operation of a linking system which causes malfunctioning of the system of FIG. 1 when the features of the linking system of the invention are not employed.
Figure 8:
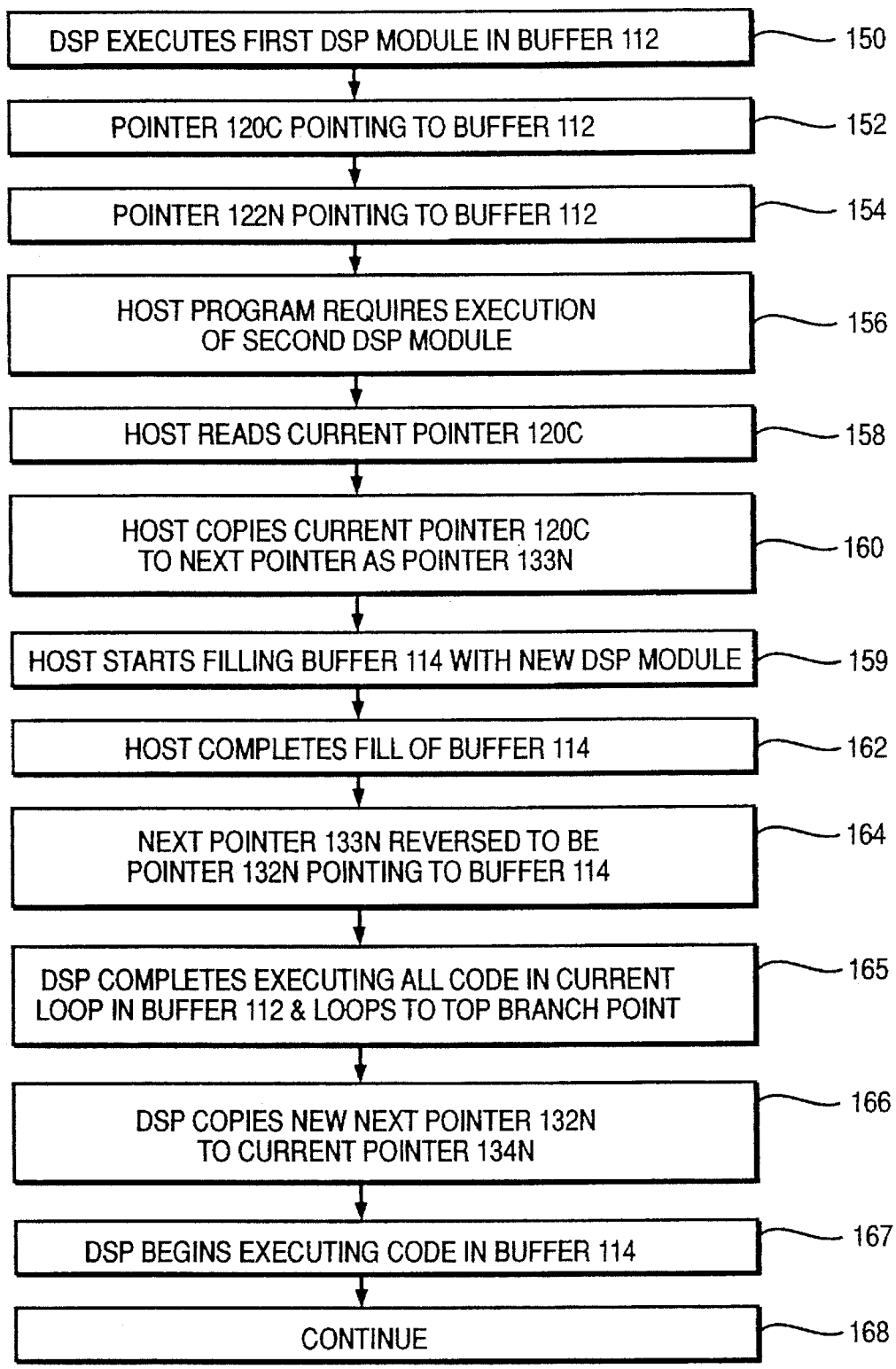
FIG. 8 is a flow diagram of the various states of the system of FIG. 1 as they relate to the pointers of FIG. 6 when operating in accordance with the invention.

Before providing a detailed description of prior art double buffering techniques with respect to FIG. 5 and the techniques of the invention with respect to FIGS. 6–8, a detailed description will be provided of a representative Audio Capture and Playback A adapter or ACPA 24 of FIG. 1 which may be employed in the computer system 12 to effect the dynamic linking of code segments in real time in accordance with the invention.

Figure 4:
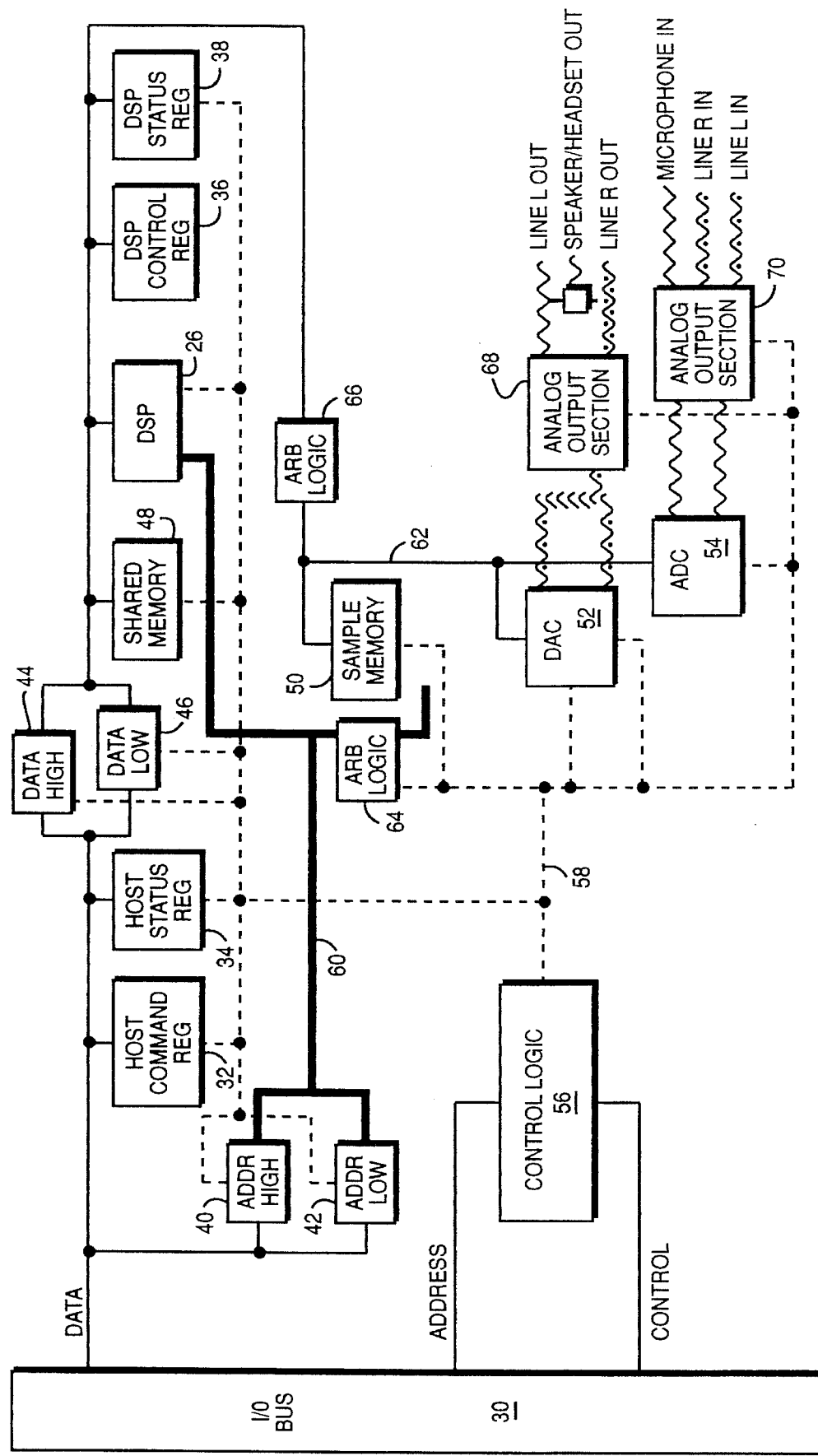
FIG. 4 is a functional block diagram of an audio capture and playback adapter card for use in the system of FIG. 1.

Thus referring now to FIG. 4, there is depicted a block diagram of an audio adapter which includes digital signal processor 26 which may be utilized to implement the method and apparatus of the present invention. As discussed above, this audio adapter may be simply implemented utilizing the IBM Audio Capture & Playback Adapter (ACPA) which is commercially available. In such an implementation digital signal processor 26 is provided by utilizing a Texas Instruments TMS 320C25, or other suitable digital signal processor.

As illustrated, the interface between processor 22 and digital signal processor 26 is I/O bus 30. Those skilled in the art will appreciate that I/O bus 30 may be implemented utilizing the Micro Channel or PC I/O bus which are readily available and understood by those skilled in the personal computer art. Utilizing I/O bus 30, processor 22 can access the host command register 34. Host command register 32 and host status register 34 are used by processor 22 to issue commands and monitor the status of the audio adapter depicted within FIG. 4.

Processor 22 may also utilize I/O bus 30 to access the address high byte latched counter and address low byte latched counter which are utilized by processor 22 to access shared memory 48 (also shown in FIG. 1 as shared memory 28) within the audio adapter depicted within FIG. 4. Shared memory 48 is preferably an 8K×16 fast static RAM which is "shared" in the sense that both processor 22 and digital signal processor 26 may access that memory. As will be discussed in greater detail herein, a memory arbiter circuit is utilized to prevent processor 22 and digital signal processor 26 from accessing shared memory 28 simultaneously.

As is illustrated, digital signal processor 26 also preferably includes digital signal processor control register 36 and digital signal processor status register 38 which are utilized, in the same manner as host command register 32 and host status register 34, to permit digital signal processor 26 to issue commands and monitor the status of various devices within the audio adapter.

Processor 22 may also be utilized to couple data to and from shared memory 38 via I/O bus 30 by utilizing data high byte bi-directional latch 44 and data low-byte bi-directional latch, 46, in a manner well known in the art.

Sample memory 50 is also depicted within the audio adapter of FIG. 4. Sample memory 50 is preferably a 2K×16 static RAM which is utilized by digital signal processor 26 for outgoing samples to be played and incoming samples of digitized audio. Sample memory 50 may be utilized as a temporary buffer to store decompressed digital audio samples and MIDI synthesized music samples for simultaneous output. Those skilled in the art will appreciate that by decompressing digital audio data and by creating synthesized music from MIDI files unit a predetermined amount of each data type is stored within sample memory 50, it will be a simple matter to combine these two outputs if desired.

Control logic 56 is also depicted within the audio adapter of FIG. 4. Control logic 56 is preferably a block of logic which, among other tasks, issues interrupts to processor 22 after a digital signal processor 26 interrupt request, controls the input selection switch and issues read, write and enable strobes to the various latches and memory devices within the audio adapter depicted. Control logic 56 preferably accomplishes these tasks utilizing control bus 58.

Address bus 60 is depicted and is preferably utilized, in the illustrated embodiment of the present invention, to permit addresses of various samples and files within the system to be coupled between appropriate devices in the system. Data bus 62 is also illustrated and utilized to couple data among the various devices within the audio adapter depicted.

As discussed above, control logic 56 also uses memory arbiter logic 64 and 66 to control access to shared memory 48 and sample memory 50 to ensure that processor 22 and digital signal processor 26 do not attempt to access either memory simultaneously. This technique is well known in the art and is necessary to ensure that memory deadlock or other such symptoms do not occur.

Finally, digital-to-analog converter 52 is illustrated and is utilized to convert the decompressed digital audio or digital MIDI synthesized music signals to an appropriate analog signal. The output of digital-to-analog convert 52 is then coupled to analog output section 68 which, preferably includes suitable filtration and amplification circuitry. Similarly, the audio adapter depicted within FIG. 4 may be utilized to digitize and store audio signals by coupling those signals into analog input section 70 and thereafter to analog-to-digital converter 54. Those skilled in the art will appreciate that such a device permits the capture and storing of analog audio signals by digitization and storing of the digital values associated with that signal.

Now that a description of the audio adapter card has been provided, a brief explanation will be given as to why conventional double buffering techniques well known in the art will be ineffective in solving the problem presented with reference to FIG. 5. As indicated therein, the traditional "ping-pong" method of double buffering, i.e. writing to one buffer while the remaining buffer is being read will not work in the disclosed implementation for dynamic linking of code segments in real time. As shown in FIG. 5, in accordance with conventional practice in the computer science art, when it is necessary for data or code to be received and stored while a processing system is continuing smoothly to execute code, it has long been known to provide for two buffers 112 and 114 in a memory system 110. It is further conventional to provide for a pointer such as pointers 116, 118, and 120 whose function it is to point to an address location of interest. Thus pointer 116 for example could be pointing to code in buffer 112 which is executing. When the host 22 has a need for execution of additional functions not provided by the code resident in the left buffer, upon an appropriate request from the host during execution of the code in the left buffer 112, the host might then begin filling the right buffer 114. Upon completion of filling the buffer 114 the current pointer would be changed as shown schematically by pointer 118 to point to the right, e.g. at the next loop through the code the pointer would provide a starting address location of the code in the right buffer 114 containing the new function to be executed whereupon execution would begin by looping through and performing the new code now contained in the right buffer 114. The next time the host required still additional function to be provided by code not then contained in the right buffer 114, in a manner correlative to the previously described steps, the host would thence begin to fill the left buffer 112. In a manner similar to the middle figure of FIG. 5, once filling of the left buffer 114 with code for performing these additional functions had been completed, the pointer would again be changed as shown schematically by pointer 120 to direct execution by the host processor of code beginning at the address space indicated by the pointer 120 corresponding to the beginning address of the new code just loaded into the left buffer 112.

One problem exists with the foregoing conventional buffering however with respect to the co-processing environment of the invention which includes both the host CPU 22 and DSP 26. The DSP 26 might be in the middle of executing code in the left buffer 112 though the right buffer 114 has filled when a second request from the host for a second new module is received in rapid succession after the first request, i.e. the host has received a request to update buffers twice in rapid succession. In such a case, the host would commence writing in code for the new function into the left buffer 112 thereby writing over unexecuted code in the left buffer 112. For the foregoing reason, in the co-processing environment of the subject invention a need arose for addressing this sort of eventuality. As shown in FIG. 7 the invention is thus in part addressing the situation depicted therein wherein a current pointer 140 is pointing to the code in the currently executing buffer 112 and a next pointer 142 is pointing to the new code in buffer 114. After the processor has left the code of buffer 112 to begin executing the new code of buffer 114 (perhaps while in the middle execution of the buffer 112), a next request requiring filling of the buffer 112 might cause writing of code involving these new functions over the code yet to be executed in the buffer 112.

Before describing operation of the invention with reference to FIGS. 6A–6D now, a distinction should be made over a form of "dynamic linking" well known in the art with reference to single processor systems employing an operating system such as the OS/2 operating system. In these systems the processor executing code is also the processor which is loading code and accordingly there is no chance of collision between these two sets of code in buffers 112 and 114. In such a system involving a single processor and a single thread, when the time has been reached for the host to branch to a new subroutine, a call is executed to an overlay, dynalink manager or the like well known in the art which loads the code module which, in turn, then executes whereupon there is a return back to the caller. This is essentially nothing other than a subroutine call where an address is obtained, branched to, and then return is made to the caller.

In such a system although linking of code modules may occur dynamically during run time, as aforesaid, because there is a single processor executing and loading code, even though the modules being loaded and executed might vary dynamically over time as required, in a single processor system, there is no chance for conflict in execution of code modules. This is in contrast with the co-processing system of the invention wherein both the host CPU 22 and DSP 26 may be simultaneously executing code and accessing common shared memory 28 of the ACPA 24.

Referring now to FIG. 6, a schematic illustration of the pointer system employed in the invention will be described in detail whereby the dynamic linking of code segments in real time is effected. As shown in the sequence of drawings in FIGS. 6A–6D the first FIG. 6A is intended to illustrate the beginning of a sequence wherein the ACPA 24 is executing code resident in the left buffer 112. At this stage each time the ACPA 24 loops through this code it is obtaining a current pointer 120 which points to the address space wherein the code resident in the buffer 112 is executing. The host CPU 22 is of course executing code associated with the CPU asynchronously. As the CPU 22 is executing its code and determines a need to implement function other than that currently being executed by the DSP 26 by means of the code in the buffer 112 (i.e. when the host determines the need to run a module such as that in FIG. 2 by the DSP different from that currently executing as a result of the code in buffer 112), the host will first cause a copy of this address (i.e. the address the current pointer 120 is point to) to be made. The host can of course make such a copy of the address associated with the current pointer 120 because the location of the pointers will be at known common addresses shared both by the DSP 26 and the host CPU 22, e.g. this is a tightly coupled co-processing system.

It will also be noted with reference to FIG. 6A that a "next" pointer 122 is provided in the memory system 110. This "next" pointer is a pointer which indicates to the DSP, when it has completed a loop through the code in a given buffer 112 or 114, the address location of precisely where it should begin executing code of a module the next time though, i.e. the next time it loops through the upper branch point of the system 110. Thus in the case shown in FIG. 6A, when the DSP is in the middle of executing the code of the module contained in buffer 112, the next pointer 122 will be pointing to the left indicating that at that time if execution were to continue through the buffer 112 and loop back to the top the left buffer 112 should continue to be executed.

Figure 6B:
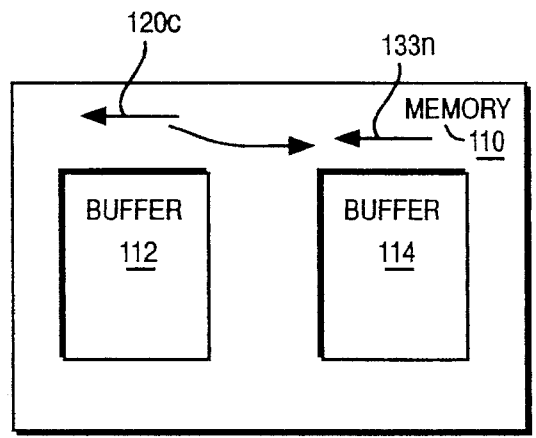

When the host, in asynchronously executing its own code, has determined that this next module is necessary for the DSP to commence executing, it first copies pointer 120C to pointer 133N (FIG. 6B). Then the host will begin filling the right buffer 114 with the new module. As long as the host is continuing to fill this buffer 114 with the code of the new function or module, it will be noted that the current pointer 120C and copy thereof 133N in FIG. 6B will continue to point to the address location of the beginning of the left buffer 112 thereby informing the DSP 26 to execute this code contained in the left buffer 112. In other words, this current pointer 120C or 133N is serving the function of informing the host CPU 22 not to write code into the left buffer 112 since the DSP 26 is still executing this code, i.e. the current pointer is pointing to the address of the start of the DSP code currently being executed and looped through.

Figure 6C:
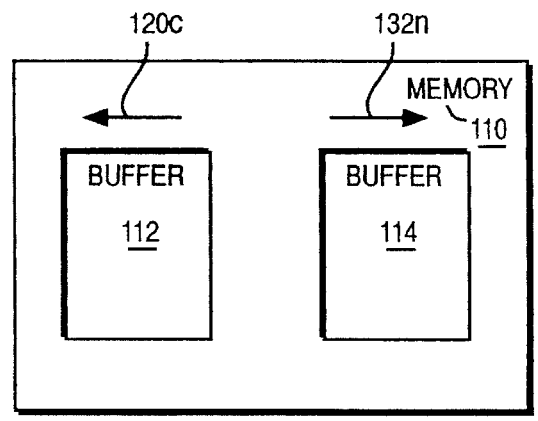
Figure 6D:
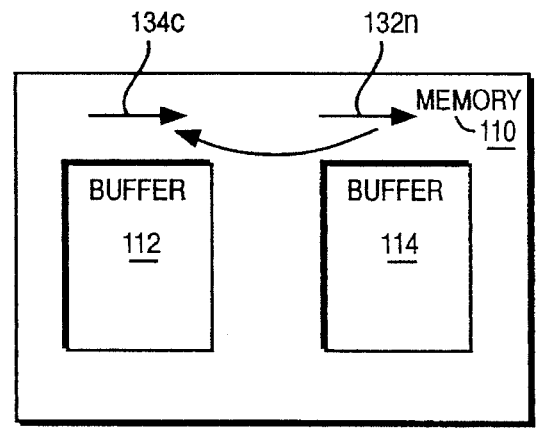

Continuing with reference to FIG. 6D, when the buffer 114 has been filled entirely by the host, the pointer 133N is reversed (shown now as pointer 132N, FIGS. 6C and 6D). When the DSP 26 has thereby executed the remainder of the code in the buffer 112 for the last time and reaches a branch point associated with the pointers as represented by the top of the system 110, the next pointer 132N (FIG. 6C) now read by the DSP 26 will thus be pointing to the code in the right buffer 114. The DSP will not copy this pointer 132N to the current pointer 134C. Accordingly, this current pointer 134C is now informing the host CPU 32 not to write code for yet additional function or modules into the right buffer 114 since the DSP 26 is now currently executing and looping on the code of the modules contained in the right buffer 114. From the foregoing it will be appreciated that the current pointer is thus pointing to the address of the buffer the DSP 26 branched to the last time it looped through code in one of the buffers. In contrast the next pointer is pointing to the address of the buffer where the DSP 26 will be executing code on the next time through the system 110.

The foregoing may be rendered clear with reference to FIG. 8 which essentially depicts a flow diagram of the steps being executed by the system of the invention for achieving the hereinbefore described dynamic linking of code segments in real time in a tightly coupled co-processing system. From this flow diagram and the accompanying description hereinbefore provided, appropriate code may be generated for effecting these steps in the manner of the invention. First block 150 is intended to represent arbitrarily a starting point in the process wherein the DSP 26 is executing a first DSP module resident in the buffer 112. At the point as shown by block 152, the current pointer 120 of FIG. 6A is pointing to the starting address location of the DSP code resident in this left buffer 112. At block 154, it is further indicated that the next pointer 122N of FIG. 6A is also pointing to this left buffer 112. At some point in the asynchronous system wherein the host CPU 22 is executing its own code, a host program will indicate execution of a second DSP module is required other than that presently in the buffer 112 undergoing current execution. This is reflected in the block 156 of FIG. 8.

At this point, the host, reading current pointer 120C which points to the left buffer 112, knows that the DSP is currently continuing to execute code in buffer 112. The host copies the current pointer 120C to the next pointer as pointer 133N, block 160, which is also pointing to block 160, which is also pointing to buffer 112, and then starts filling buffer 114 with the new modules' code (shown at block 159).

When the buffer 114 is thus filled, as shown at block 164 of FIG. 8, the next pointer 133N, FIG. 6B, is reversed as shown in FIG. 6C to now become next pointer 132N which now points to the thus completely filled right buffer 114. This indicates, as previously noted, that the next time the DSP is about to begin to cycle through execution of code in the buffer 112, that since the right buffer 114 is now filled (and the next pointer, having been reversed as pointer 132N is now pointing to the right buffer 114), the DSP 26 may now commence execution of the code in this buffer 114 during the next cycle through code in the buffers. This is represented at block 166 and block 167.

Finally, block 168 indicates that upon a next request for yet an additional new module to be executed by the DSP, the mirror image or opposite of the just-described process will continue, wherein the host will begin re-filling buffer 112 while the DSP is executing buffer 114 code. When buffer 112 is completely refilled and the DSP has completed execution of all code in buffer 114, the DSP, in accordance with the pointer reversal in the manner previously described, will again commence executing this code in buffer 112.

While the invention has been shown and described with reference to particular embodiments thereof, it will be understood by those skilled in the art that the foregoing and other changes in form and details may be made therein without departing from the spirit and scope of the invention.

I claim:

1. A system for dynamically linking code segments in real time, comprising
    a first microprocessor;
    a second microprocessor;
    shared memory accessible by said first and second microprocessor comprising
        a first buffer; and
        a second buffer;
    means for periodically causing code executable by said second microprocessor to be alternately updated in said shared memory by said first microprocessor;
        a first state wherein a first portion of said code is updated in said first buffer by said first microprocessor while a second portion of said code is executed by said second microprocessor from said second buffer; and
        a second state wherein a third portion of said code is updated in said second buffer by said first microprocessor while said first portion of said code is executed by said second microprocessor from said first buffer; and
    pointer means indicating which of said first and second states said code is in.

2. A method for linking code segments in an asynchronous multiprocessor computer system accessing common shared memory comprised of first and second buffers, said method comprising the steps of:
    executing a first code module in said shared memory by a first processor while asynchronously loading and linking code segments comprising a second code module in said shared memory by a second processor; and
    executing said second code module with said first processor while asynchronously loading and linking code segments comprising a third code module in said shared memory with said second processor;
    and wherein said method further includes
        alternately executing code from said first and second buffers with said first processor;
        loading and linking with said second processor at least one code module into said second buffer when said first processor executes code in said first buffer;
        loading and linking with said second processor at least one code module into said first buffer when said first processor executes code in said second buffer;
        setting a first pointer variable to an address location corresponding to one of said buffers which is being executed upon when said first processor is currently executing code; and
        setting a second pointer variable to an address location corresponding to a remaining one of said buffers after being updated by said second processor with code segments comprising at least one code module loaded and linked by said second processor while said first processor is executing said code.

3. The method of claim 1 wherein said first processor is a digital signal processor.

4. The method of claim 1 wherein said first processor is a microprocessor.

5. The method of claim 3 wherein said first code module corresponds to code executed by said digital signal processor causing said digital signal processor to generate acoustic data corresponding to a first sound.

6. The method of claim 5 wherein said second code module corresponds to code executed by the digital signal processor causing said digital signal processor to generate acoustic data corresponding to a second sound.

7. The method of claim 6 wherein said digital signal processor executes said first and second code modules from said first and second buffers alternately at a rate wherein said first and second sounds occur simultaneously.

8. A method for dynamically linking code segments in an asynchronous computer system having a first and second processor and wherein said processors access shared memory having a first and second buffer, said method comprising the steps of
    generating a first pointer variable pointing to one of said first and second buffers containing a first code module;
    accessing said first pointer variable by said second processor to determine which one of said first and second buffers is being executed by said first processor;
    storing and linking code segments comprising a second code module with said second processor in a remaining one of said first and second buffers with said second processor as a function of said accessing said first pointer variable and during execution of said first code module;
    generating a second pointer variable;
    accessing with said first processor said second pointer variable;
    making a copy of the value of said second pointer variable with said first processor to said first pointer variable;
    branching with said first processor to said one of said first or second buffers pointed to by said first pointer variable;
    relinking with said second processor to said remaining one of said first and second buffers while said one of said first and second buffers is being asynchronously executed by said first microprocessor; and
    asynchonously executing said remaining one of said first and second buffers after said relinking.

9. The method of claim 8 further comprising setting said second pointer variable equal to said first pointer variable with said second processor;

relinking with said second processor into code segments of said remaining one of said first and second buffers; and setting said second pointer variable to said remaining one of said first and second buffers.

10. A method for sharing memory in a multiprocessor system having a first and second multiprocessor and further having first and second shared buffers, comprising generating a first and second pointer indicating, respectively, which of said first and second buffers is currently being executed by said second microprocessor and which of said first and second buffers is being updated by said first microprocessor;

storing code executable by said second microprocessor in said first buffer;

initializing said first and second pointers to point to said first buffer containing said executable code;

detecting when said second microprocessor requires execution of said code;

reading said second pointer by said second microprocessor in response to said detecting;

copying with said second microprocessor said second pointer to said first pointer;

branching by said second microprocessor to the one of said first and second buffers pointed to by said first pointer;

relinking by said first microprocessor to one of said first and second buffers;

executing code by said second microprocessor in an opposite one of said first and said second buffers concurrently with said relinking;

setting said second pointer with said first microprocessor equal to said first pointer;

relinking with said first microprocessor to said opposite one of said first or said second buffers from that pointed to by said first pointer; and setting said second pointer to said opposite one of said first or said second buffers.

\* \* \* \* \*